United States Patent
Yuan (10) Patent No.: US 7,154,503 B2
(45) Date of Patent: Dec. 26, 2006

(54) METHODS AND SYSTEMS FOR BRUSH COMPOSITION

(75) Inventor: Feng Yuan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/095,205

(22) Filed: Mar. 31, 2005

(65) Prior Publication Data

US 2006/0227150 A1    Oct. 12, 2006

(51) Int. Cl.
*G09G 5/36* (2006.01)
*G09G 5/02* (2006.01)
*G09G 5/00* (2006.01)

(52) U.S. Cl. .................. 345/553; 345/592; 345/629
(58) Field of Classification Search ............ 345/553, 345/581, 612, 592, 629, 630, 641
See application file for complete search history.

(56) References Cited

U.S. PATENT DOCUMENTS

| | | | | |
|---|---|---|---|---|
| 5,999,190 A | * | 12/1999 | Sheasby et al. ............ | 345/589 |
| 6,268,865 B1 | * | 7/2001 | Daniels et al. ............. | 345/582 |
| 6,795,069 B1 | * | 9/2004 | Raskar et al. .............. | 345/419 |
| 2006/0050078 A1 | | 3/2006 | Monahan | |

OTHER PUBLICATIONS

Foreign Search Report dated Jun. 12, 2006, relating to Application No. PCT/US05/30358.

* cited by examiner

*Primary Examiner*—Kee M. Tung
*Assistant Examiner*—Hau Nguyen
(74) *Attorney, Agent, or Firm*—Lee & Hayes, PLLC (57) ABSTRACT

In various embodiments, methods and systems for brush composition are described. In one particular application of brush composition, opacity issues are addressed by focusing on the composition of objects having opacity effects in terms of the brushes that are used to render the objects. By focusing on the brushes that are used in the rendering process, instead of the individual objects and their particular colors, processing economies and efficiencies can be experienced. Specifically, in some instances, because of the particular way that overlapping objects interact, focusing on the brushes that are used with the individual objects and creatively attempting to combine or compose the brushes for operating on the areas of overlap, some processing steps that might otherwise have been required at the object/color level can be eliminated, thus providing a streamlined and efficient process.

10 Claims, 6 Drawing Sheets

METHODS AND SYSTEMS FOR BRUSH COMPOSITION

TECHNICAL FIELD

This invention relates to graphics methods and systems.

BACKGROUND

Modern graphics systems support a concept known as "opacity" to achieve a visual effect where a graphics primitive that is rendered using opacity appears to be translucent to a varying degree. One challenge, as such pertains to opacity, concerns how to convert such graphics primitives to a system which does not support or has very little support for opacity.

Opacity or transparency is typically represented as a value between 0 and 1. When objects overlap, these values control how two or more objects compose with each other to form a final composed object.

Many traditional devices, such as printers like PCL printers or Postscript printers do not support opacity, or if they do, have limited support for opacity. One traditional approach to attempt to print content having opacity on these types of devices involves rasterizing large parts of a page. Specifically, wherever transparent content is found, those portions of the page are typically rasterized in an attempt to approximate or otherwise deal with the opacity effect.

Opacity-induced rasterization is widely considered unacceptable due to the large amount of rasterized print data that is generated, and due to the resolution dependency that it introduces.

Some systems which attempt to deal with opacity effects use GDI raster operations or Postscript image mask operations. But such attempts often tend to lower the printing quality of the images, create large files sizes and, in the end, provide very limited opacity support.

Accordingly, this invention arose out of concerns associated with providing improved systems and methods for processing graphics and, in particular, improved methods and systems that can be employed to support opacity in the context of devices, such as printers, that themselves have little or no support for opacity.

SUMMARY

In various embodiments, methods and systems for brush composition are described. In one particular application of brush composition, opacity issues are addressed by focusing on the composition of objects having opacity effects in terms of the brushes that are used to render the objects. By focusing on the brushes that are used in the rendering process, instead of the individual objects and their particular colors, processing economies and efficiencies can be experienced. Specifically, in some instances, because of the particular way that overlapping objects interact, focusing on the brushes that are used with the individual objects and creatively attempting to combine or compose the brushes for operating on the areas of overlap, some processing steps that might otherwise have been required at the object/color level can be eliminated, thus providing a streamlined and efficient process.

DETAILED DESCRIPTION

Overview

In various embodiments, methods and systems for brush composition are described. In one particular application of brush composition, opacity issues are addressed by focusing on the composition of objects having opacity effects in terms of the brushes that are used to render the objects. By focusing on the brushes that are used in the rendering process, instead of the individual objects and their particular colors, processing economies and efficiencies can be experienced. Specifically, in some instances, because of the particular way that overlapping objects interact, focusing on the brushes that are used with the individual objects and creatively attempting to combine or compose the brushes for operating on the areas of overlap, some processing steps that might otherwise have been required at the object/color level can be eliminated, thus providing a streamlined and efficient process. It is to be appreciated and understood that the inventive brush composition techniques described in this document can be employed in a number of different scenarios. One specific scenario which is described below pertains to opacity-related processing. It is to be appreciated that the inventive techniques can be employed in other scenarios without departing from the spirit and scope of the claimed subject matter.

As some background on brushes, consider the following. A color is typically a static value and can be represented in a number of different ways. A brush, on the other hand, is typically defined as a function that maps locations to color. In other words, given a location (x,y), a brush can return a different color depending on how the brush is specified. A brush can be used to "paint" the interior of geometric shapes and, in at least some systems, to fill character outlines.

In addition, there are many different types of brushes. For example, a solid color brush can be used to fill defined geometric regions with a uniform color. An image brush can be used to fill a region with an image using different tiling methods. A visual brush can be used to fill a region with a vector drawing. A linear gradient brush can be used to fill a region with periodic colors following parallel lines. A radial gradient brush can be used to fill a region with periodic colors following ellipsis. The color pattern of a gradient brush is defined by a serious of gradient stops, each with a position and a color.

In addition, in at least some systems, brushes can have an opacity attribute that defines the uniform transparency of the brush fill. Further, certain special types of brushes can have attributes that permit a variable opacity with regard to the brush fill. Thus, across a particular brush's fill, the opacity can vary.

Needless to say, there are any number of different types of brushes and ways of describing brushes. Hence, the inventive principles described herein are not intended to be limited to only the types of brushes that are specifically mentioned. Rather, the inventive principles described can be employed in connection with other different kinds of brushes without departing from the spirit and scope of the claimed subject matter.

In the approaches described below, objects, such as primitives, that overlap and their associated overlapping regions are identified. The brushes that are associated with the individual objects are then evaluated in view of the objects and their overlapping regions, and the attributes associated with the brushes. If appropriate, a new brush that corresponds to and is to be used for the overlapping region is computed or composed as a function of the brushes associated with the objects. In some instances, certain brush combinations may not be compatible for direct composition. In this case, a brush list is built and processing of the non-compatible brushes is deferred until later.

After all of the objects have been processed as noted above, the brushes in the brush list are then processed in an attempt to decompose the brushes into a smaller series of combinable brushes such that they can be individually composed to provide resultant brushes that can then be applied to particular overlapping sub-region of interest. In the event that there is no meaningful way to decompose a particular brush, the sub-region of interest can be rasterized into a bitmap using all of the brushes involved, and then further processed for printing the objects on a print media.

Figure 1:
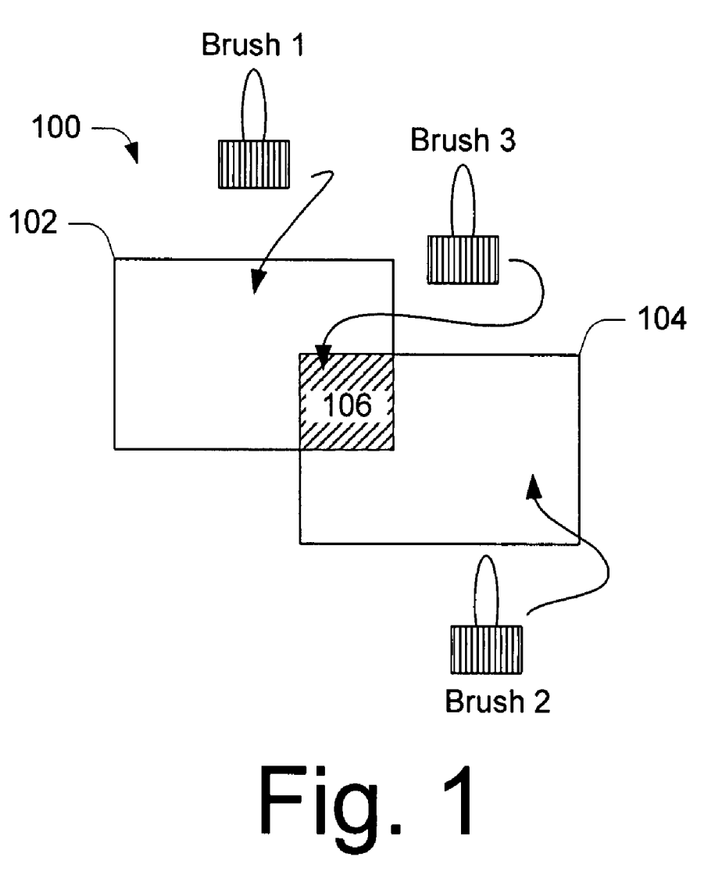
FIG. 1 is diagram that illustrated two overlapping objects or primitives and is useful in understanding the inventive principles described herein.

As an example of the above, consider FIG. 1 which shows two objects 102, 104 which are seen to overlap to define an overlap region 106. In this example, assume that object 102 is associated with a brush—brush 1—that is to be used to fill it, and object 104 is associated with a brush—brush 2—that is to be used to fill it. Also assume that object 104 overlies object 102.

First, the objects that overlap are identified as well as their corresponding overlapping regions. Thus, in this case, objects 102 and 104 are identified, as well as overlapping region 106.

In the discussion that follows, we will consider two cases—one in which brush 2 is totally opaque, and one in which brush 2 is partially opaque.

First, consider the case in which brush 2 is totally opaque. In this case, since that portion of object 104 that overlaps with object 102 will totally obscure it, there is no need to compute or compose a brush that is to be used to fill region 106. Now consider the case in which brush 2 is partially opaque. In this case, that portion of object 104 that overlaps with object 102 will not totally obscure it. In this case, and assuming that the brushes are compatible, a new brush—brush 3—is computed or composed from brushes 1 and 2, and then used to fill region 106. In the case that brushes 1 and 2 are not compatible, the brushes would be placed in a brush list for later decomposition in an attempt to find a smaller series of compatible brushes that can be composed.

Some Principles of Brush Composition

In the above example, we generally described the notion of computing or composing a new brush from two individual brushes. In the illustrated and described embodiments, this notion of brush composition is referred to as "brush algebra". This is because brush composition embodies several different algebraic characteristics which will shortly be discussed.

Before exploring brush algebra, consider the following discussion of some principles of color composition.

In many systems, every color has its color information encoded in multiple channels—for example (red, green, blue) or (cyan, magenta, yellow). The values for each channel range from 0 for non intensity to 1 for full intensity.

To control how colors are combined to form new colors, an additional opacity channel (also referred to as an alpha channel) is added. Opacity channels are also typically in the range of 0 to 1. Hence, a color in RGB space can be denoted as (R, G, B, a), where "a" represents the alpha value. As an example, opaque blue is typically represented as (0, 0, 1, 1), opaque yellow as (1, 1, 0, 1), and half transparent yellow as (1, 1, 0, 0.5).

When a solid color is rendered on any background, the result is simply the solid color itself. However, when a transparent color is rendered on a background, the background color and the transparent color need to be composed (also known as blended) to generate the new color. The normal composition operation that is used is called source-over composition, as will be appreciated by the skilled artisan.

Thus, given a destination color D and source color (A, a), where "A" represents the color channel information and "a" represents the opacity channel, the new composed color D' under source-over composition is given mathematically given as follows:

$$D'=D*(1-a)+A*a \quad \text{(Formula 1)}$$

Composition is applied to each color each within a color independently. The resultant color will have opacity of 1. For example, when blue (0, 0, 1, 1) is composed with half transparent yellow (1, 1, 0, 0.5), the result is (0.5, 0.5, 0.5, 1), which is gray.

The idea of brush algebra is to algebraically combine the brushes to yield a resultant new brush that can be applied to a region of interest. For example, according to Formula 1 above, when color (A, a) is rendered on top of color D, the resultant color is $D'=D*(1-a)+A*a$.

Likewise, if color (B, b) is rendered on top of resultant color D', the final color would be given as:

$$D''=D*(1-a)*(1-b)+A*a*(1-b)+B*b \quad \text{(Formula 2)}$$

Now, let color (C, c) be $((A*a*(1-b)+B*b)/(a+b-a*b), a+b-a*b)$. Rendering (C, c) on top of D generates the same result as D", the result of rendering (A, a) first and then (B, b).

This notion provides a basic formula for accomplishing brush algebra. That is, two solid color brushes (A, a) and (B, b) can be composed to generate a new solid color brush (C, c) in accordance with the following formula:

$$(C, c)=((A*a*(1-b)+B*b)/(a+b-a*b), a+b-a*b) \quad \text{(Formula 3)}$$

Extending this principle, let X and Y be two brushes. The expression X*Y is used to represent the result of compositing or composing X and Y into a new brush. Given this representation, the following describes some of the algebra properties of brush composition.

Algebraic Properties of Brush Composition

First, brush composition is associative, meaning that:

$$(X*Y)*Z=X*(Y*Z).$$

Further, if Y is totally transparent, then X*Y=X. This has the effect of being able to remove totally transparent primitives from a display list, as will become apparent below.

In the event Y is totally opaque, the composition of X*Y can be given as follows:

$$X*Y=Y$$

Hence, primitives that are totally covered by opaque primitives can be removed from a display list, as will become apparent below.

In the event brushes X and Y are solid color brushes, their composition into a new brush can accomplished by employing Formula 3 above.

In the event brush X is a gradient brush and brush Y is a solid color brush, a new gradient brush can be created by composing each of its color with the solid color.

In the event brushes X and Y are gradient brushes and are compatible, a new gradient brush can be created by composing the corresponding colors of each brush. In this case, additional stops may be added to make the result more accurate, as will be appreciated by the skilled artisan. To determine whether gradient brushes are compatible, the attributes or properties of each brush are examined in relation to their intended use on the objects with which they are associated. As gradient brushes can be described in different ways and with different properties, the examination and evaluation of their properties to ascertain compatibility will vary as well. As but one example, linear gradient brushes typically have properties that include a starting point, an ending point and a sequence of gradient stops, each with an offset and a color. These properties define what is referred to as the periodic color pattern of the brush. In at least some cases, if two gradient brushes have the same periodic pattern, they are said to be compatible. If they do not have the same periodic pattern, or if the periodic patterns of the brushes are not within desired tolerances, then the brushes are said to be incompatible. In the simplest form, two linear gradient brushes with the same start point, end point, and gradient offsets are considered compatible for composition.

In the event brush X is a solid color brush and brush Y is an image brush, a new brush can be created by composing each color in the image with the solid color, thus generating a new image brush.

If brush X is an image brush and brush Y is a compatible tile brush (e.g. an image brush or drawing brush), then a new brush can be created by compositing the tile brush into the image brush.

If brush X is a singleton image brush and Y is any type of brush, then a new brush can be created by rasterizing brush Y and then composing the rasterized brush with the image brush to generate a new image brush. Some scaling may be performed in certain circumstances.

If brush X is a solid color brush and brush Y is a drawing brush, then a new drawing brush can be created by adding a full fill primitive with the solid color brush.

Most of these rules can be applied when the order of X and Y is exchanged. But in more general cases, it's not possible to create a single simple brush to represent the composition of two brushes. In these cases, a new type of brush can be created by creating a brush list of individual brushes in their original order, as brush composition is associative.

In the event brush X is a solid color brush and brush Y is a brush list, a new brush list can be created by composing the solid color brush with the first or last brush in the list, thus forming a new brush list with the same number of brushes.

If brush X is any type of brush and brush Y is a brush list, then a new brush list can be created by listing all of the brushes in order.

During brush composition, two brushes are either directly composed to form a new simple brush, or a brush list is generated to represent their composition. Eventually, a brush list needs to be decomposed into simple brushes. But no immediate decomposition takes place at this point. Decomposition is deferred to a later time, as will be discussed below. By forming a brush list and deferring decomposition until as late as possible, some optimizations can take place. For example, if two incompatible brushes in the brush list are overlaid with a totally opaque brush, then the incompatible brushes can effectively be removed from the brush list before decomposition is attempted. Building a brush list also allows decomposition cost estimation. If decomposition is considered to be more costly than rasterizing, then a brush list can be rasterized instead of decomposed. Brush lists also allow removal of transparency layers which are not so visible on the top. For example, we can discard brushes in the beginning of a brush list which contributes to less than 5% in final color after composition.

Opacity Masks

So far, we have talked about different types of brushes and how they can be algebraically manipulated to either form new composited brushes, or placed in a brush list for further decomposition processing. Before describing how brush composition and decomposition is incorporated into an exemplary image processing process, consider the notion of an opacity mask.

An opacity mask is essentially an extension of an opacity value. Instead of applying a uniform opacity value throughout a particular area, an opacity mask can apply a variable opacity value that is generated by a brush specification. Thus, in some instances, an opacity mask comprises a brush whose color channel data is ignored and whose opacity channel data is used as the definition of the opacity.

Now consider the case of brush composition as such pertains to opacity masks. When an opacity mask is composed with another brush, the opacity mask is multiplied with the opacity channel of colors in the subject brush. When two opacity masks are composed together, their transparencies are multiplied together.

The composition of opacity masks is somewhat different from the brush composition described above.

First, opacity mask composition is commutative. That is, using the nomenclature used above:

$$X*Y=Y*X.$$

Further if opacity mask X is opaque:

$$X*Y=Y.$$

That is, the opaque opacity mask can be ignored. Further, if either opacity mask X or Y is totally transparent, then:

$$X*Y=0.$$

What this means then is that primitives in a display list with totally transparent opacity masks can be removed.

If both opacity masks are solid color opacity masks, then a new opacity mask can be created by multiplying the masks' opacity values.

When an opacity mask is finally to be applied to primitives, it will then need to be composed with a brush or an image. For simple cases, an opacity mask can be blended into the brush to form a new brush. What follows are some simple cases:

If brush X is a solid color brush and brush Y is an opacity mask, then a new brush can be created by blending the color X with each opacity value in the brush Y. For example, a solid color brush with a linear gradient opacity mask generates a linear gradient brush.

If brush X is a gradient brush and brush Y is a compatible gradient brush opacity mask, then a new gradient brush can be generated.

If brush X is an image brush and brush Y is a compatible opacity mask, then a new image brush can be generated.

For more complicated cases, such as those where brushes are not compatible as described above, the composition of a brush and an opacity mask cannot be reduced to another simple brush. Thus, the opacity mask is stored together with the brush, until the decomposition processing.

Exemplary Method

Figure 2:
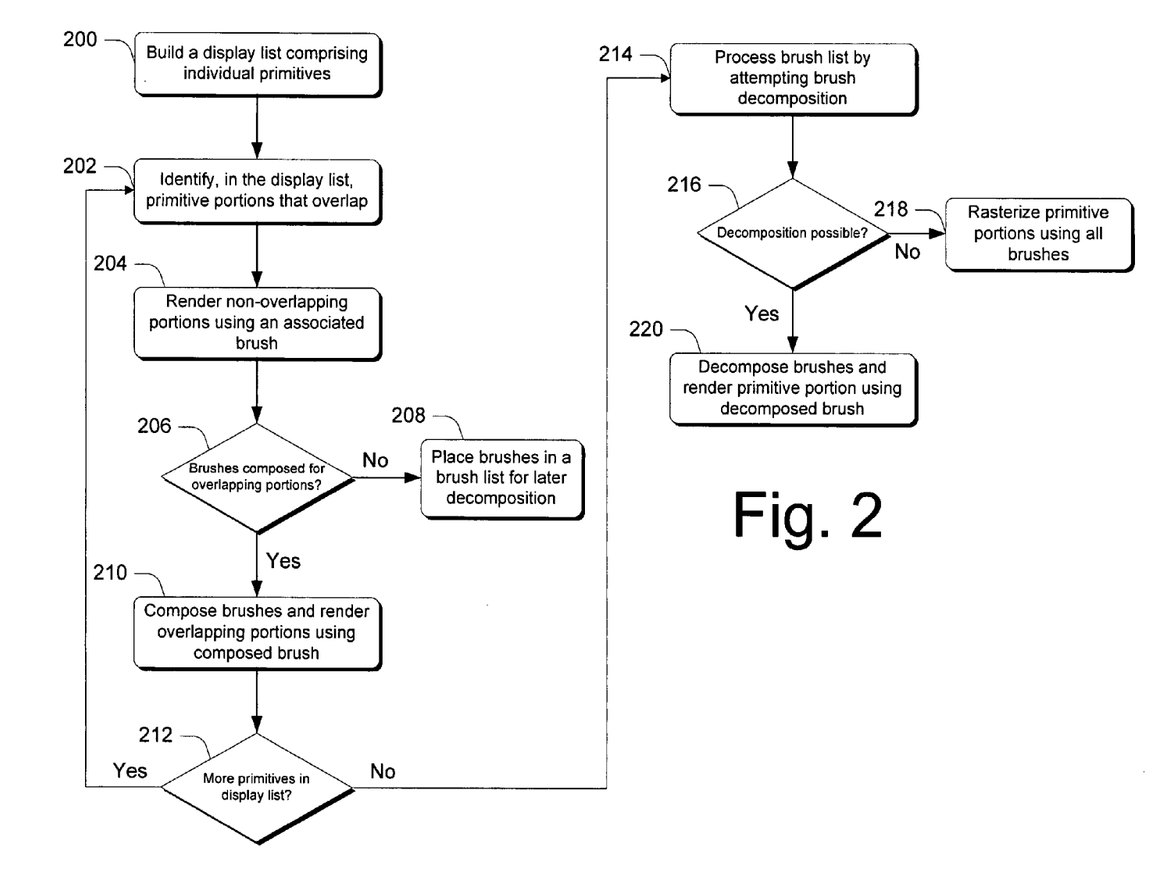
FIG. 2 is a flow diagram that describes steps in a method in accordance with one embodiment.

FIG. 2 is a flow diagram that describes steps in a method in accordance with one embodiment. The method can be implemented in connection with any suitable hardware, software, firmware or combination thereof. In but one embodiment, the method can be implemented using a system, such as the systems shown and described below.

The method about to be described can be broken up into two primary stages. A first stage processes data that is to be, for example, printed on a printer and builds a display list that contains individual primitives. The second stage then sets about resolving primitive intersections, performs brush composition and decomposition. Further, in the discussion that follows, the method does not describe some of the recursive processing that can take place during the resolution of the primitive intersections. This recursive processing is described in more detail in the section entitled "Implementation Example" just below. Accordingly, the description of the method just below is intended to broadly cover some of the inventive notions of brush composition.

Accordingly, step 200 builds a display list comprising individual primitives. This step can be performed in any suitable way. For example, this step can be performed by receiving input data, such as that which is intended for printing on a printer, and processing the input data to identify the individual primitives. As input data can assume different forms, so too can the process of identifying the individual primitives and building the display list. One implementation example is described below under the heading "Implementation Example" and pertains to input data that takes the form of a hierarchically structured tree that describes the data that is to be printed.

Once the display list is built, step 202 identifies, in the display list, primitive portions that overlap. One exemplary overlapping portion is illustrated in FIG. 1. Step 204 then renders non-overlapping portions using brushes that are associated with the non-overlapping portions. For those portions that overlap, step 206 determines whether the associated brushes can be composed. Any suitable criteria can be utilized to ascertain whether the brushes can be composed. For example, in the discussion above, brushes that are found to be compatible can be composed. If the brushes associated with the overlapping portions cannot be composed as, for example, by being incompatible, then step 208 places the brushes in a brush list for later decomposition.

If, on the other hand, the brushes can be composed, then step 210 composes the brushes and renders the overlapping portions using the composed brush. The brushes can be composed in any suitable way. Examples of brush composition principles and techniques are given above.

Step 212 then determines whether there are more primitives in the display list. If there are, the method returns to step 202. If there are no additional primitives in the display list, then step 214 processes the brush list by attempting brush decomposition. If, at step 216, brush decomposition is not possible or too costly, then step 218 rasterizes the primitive portions using all of the brushes. If, on the other hand, brush decomposition is favorable, step 220 decomposes the brushes and renders the primitive portion using the decomposed brushes.

Brush decomposition is the process of converting a primitive with a brush list to a series of primitives each with a simple brush. As mentioned before, a brush list is only created when brushes can be composed into a simple brush. For example, a linear gradient brush and a radial gradient brush normally can't be composed into a single simple brush. Brush decomposition works by picking the first two brushes in a brush list and trying to decompose one of them into a series of simple brushes. The process is repeated until all brushes within the brush list are handled.

A primitive with a linear gradient brush can be decomposed into a series of rectangles, each filled with a solid color brush. The number of such rectangles are determined by how many periodic cycles of the linear gradient are needed to fill the region and how many slices are needed to approximate one cycle of gradient.

A primitive with a radial gradient brush can be decomposed into a series of elliptic rings, each filled with a solid color brush. The number of such rings are determined by how many periodic cycles of the radial gradient are needed to fill the region and how many slices are needed to approximate one cycle of gradient.

The density of such decomposition is determined by the size of the region, variation of colors in gradient stops, and an external quality setting.

In the case of a brush list with a linear gradient brush and a radial gradient brush, the radial gradient brush will be decomposed into a series of solid colors, each for an elliptic ring. Then each of them can be composed with the linear gradient brush, so we end up with a series of linear gradient brushes, each filling an elliptic ring, with the original shape as clipping region.

Brush decomposition is also applied to a brush with an opacity mask brush, or between two opacity mask brushes.

Implementation Example

As noted above in the discussion of FIG. 2, the input data that is processed to build the display list can take any suitable form. In one particular embodiment, the inventive brush composition techniques can be employed in connection with a modular content framework and document format system that defines a set of building blocks for composing, packaging, distributing, and rendering document-centered content. One such system is known as Microsoft's Metro Modular Content Framework and Document Format. These building blocks define a platform-independent framework for document formats that enable software and hardware systems to generate, exchange, and display documents reliably and consistently.

In addition to this general framework and format, the brush composition techniques can be employed with a particular format, known as the reach package format, that is defined using principles of the general framework. The reach package format is a format for storing paginated documents. The contents of a reach package can be displayed or printed with full fidelity among devices and applications in a wide range of environments and across a wide range of scenarios.

To provide some context for an appreciation of the inventive brush composition techniques described above, the discussion below first provides a high level overview of the modular content framework under the section entitled "General Framework". After this section, a section entitled "The Reach Package" provides a high level overview of the reach package format. For additional information on these formats, the reader is referred to the following U.S. patent applications: U.S. application Ser. Nos. 10/836,327; 10/836,326; 10/837,041; 10/836,608; 10/837,040; 10/837,043; and 10/837,042.

General Framework

Figure 3:
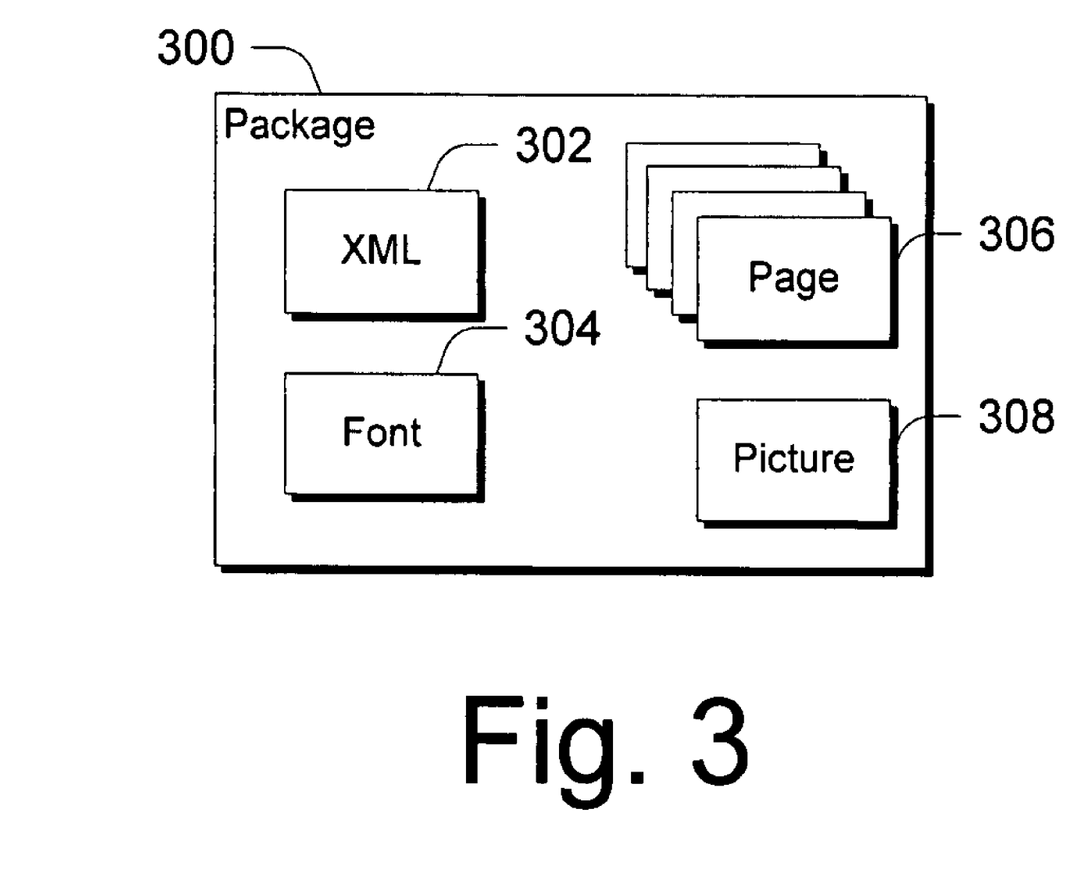
FIG. 3 is a block diagram that illustrates a package that can be utilized in connection with one or more of the described embodiments.

The general framework referenced above makes use of package model in which content is held within a package. A package is a logical entity that holds a collection of related parts. The package's purpose is to gather up all of the pieces of a document (or other types of content) into one object that is easy for programmers and end-users to work with. For example, consider FIG. 3 which illustrates an exemplary package 300 holding a document comprising a number of parts including an XML markup part 302 representing the document, a font part 304 describing a font that is used in the document, a number of page parts 306 describing pages of the document, and a picture part representing a picture within the document. The XML markup part 302 that represents a document is advantageous in that it can permit easy searchability and referencing without requiring the entire content of a package to be parsed.

In accordance with at least one embodiment, a single package contains one or more representations of the content held in the package. Often a package will be a single file, also referred to as a container.

A package is a logical entity that may be represented physically in a variety of ways (e.g., without limitation, in a single file, a collection of loose files, in a database, ephemerally in transit over a network connection, etc.). Thus containers hold packages, but not all packages are stored in containers.

An abstract model describes packages independently of any physical storage mechanism. For example, the abstract model does not refer to "files", "streams", or other physical terms related to the physical world in which the package is located.

In the general framework context, a part comprises common properties (e.g., a name) and a stream of bytes. In addition to its content, each part has some common part properties. These include a name—which is the name of the part, and a content type—which is the type of content stored in the part. Parts may also have one or more associated relationships.

Part names are used whenever it is necessary to refer in some way to a part. In the illustrated and described embodiment, names are organized into a hierarchy, similar to paths on a file system or paths in URIs. Below are examples of part names:

/document.xml
/tickets/ticket.xml
/images/march/summer.jpeg
/pages/page4.xml

The segments of the names of all parts in a package can be seen to form a tree. This is analogous to what happens in file systems, in which all of the non-leaf nodes in the tree are folders and the leaf nodes are the actual files containing content. These folder-like nodes (i.e., non-leaf nodes) in the name tree serve a similar function of organizing the parts in the package. It is important to remember, however, that these "folders" exist only as a concept in the naming hierarchy—they have no other manifestation in the persistence format.

In the illustrated and described embodiment, every part has a content type which identifies what type of content is stored in a part. Examples of content types include:

image/jpeg
text/xml
text/plain; charset="us-ascii"

Parts in a package may contain references to other parts in that package. In general, however, these references are represented inside the referring part in ways that are specific to the content type of the part; that is, in arbitrary markup or an application-specific encoding. As such, the general framework uses relationships to identify relationships between parts and to describe the nature of those relationships. In one embodiment, the relationships are represented in XML as individual parts. Each part in the container that is the source of one or more relationships has an associated relationship part; this relationship part holds the list of relationships for the source part.

The general framework utilizes descriptive metadata parts that can be used to provide writers or producers of packages with a way in which to store values of properties that enable readers of the packages to reliably discover the values. These properties are typically used to record additional information about the package as a whole, as well as individual parts within the container. For example, a descriptive metadata part in a package might hold information such as the author of the package, keywords, a summary, and the like.

In the context of the general framework, the descriptive metadata is expressed in XML, is stored in parts with well-known content types, and can be found using well-known relationship types. For additional information on descriptive metadata, the reader is referred to the Patent Applications referenced above.

The general framework is built upon and appreciates a physical model which defines various ways in which a package is used by writers and readers. This model is based on three components: a writer, a reader and a pipe between them.

The pipe carries data from the writer to the reader. In many scenarios, the pipe can simply comprise the API calls that the reader makes to read the package from the local file system. This is referred to as direct access.

Often, however, the reader and the writer must communicate with each other over some type of protocol. This communication happens, for example, across a process boundary or between a server and a desktop computer. This is referred to as networked access and is important because of the communications characteristics of the pipe (specifically, the speed and request latency).

In order to enable maximum performance, physical package designs consider support in three important areas: access style, layout style and communication style. For additional information on each of these styles, the reader is referred to the Patent Applications incorporated by reference above.

Having described and made reference to a general framework, the discussion that follows describes a specific framework that is built in accordance with the principles of the general framework.

The Reach Package

A Metro payload is a collection of parts, including an identifiable "root" part and all the parts required for valid processing of that root part. For instance, a payload could be a fixed-layout representation of a document, a reflowable representation, or some other arbitrary representation.

Below is a description of a particular representation called the fixed payload. A fixed payload has a root part that contains FixedDocument markup, which in turn references FixedPage parts. Together, these describe a precise rendering of a multi-page reach payload.

A package which holds at least one fixed payload, and follows other rules described in the Patent Applications referenced above, is known as a reach package. Readers and writers of reach packages can implement their own parsers and rendering engines, based on this specification of the reach package format.

Using known rendering rules, reach packages can be unambiguously and exactly reproduced or printed from the format in which they are saved, without tying client devices or applications to specific operating systems or service libraries. Additionally, because the reach package is expressed in a neutral, application-independent way, the content can be viewed and printed without the application used to create the package. The key to this ability is the fixed payload contained in the reach package.

A fixed payload has a fixed number of pages, and page breaks are always the same. The layout of all the elements on a page in a fixed payload is predetermined. Each page has a fixed size and orientation. No layout calculations have to be performed—content can just be rendered. This applies not just to graphics, but to text as well, which is represented in the fixed payload with precise typographic placement. The content of a page (text, graphics, images) is described using a powerful but simple set of visual primitives.

Reach packages support a sequencing part, the FixedDocumentSequence, for gluing together a set of FixedDocuments into a single, larger "document." For example, an end user may want to glue together two documents that came from different sources: a two-page cover memo (a FixedDocument) and a twenty-page report (a FixedDocument).

In addition to this simple use of FixedDocumentSequence for composition in a reach package, FixedDocumentSequences can also contain further FixedDocumentSequences, allowing for complex, hierarchical reach packages.

Reach packages also support PrintTickets. A PrintTicket provides settings that should be defined by reach package writers. PrintTickets within a reach package must be processed when the package is printed. PrintTickets can be attached in a variety of ways to achieve substantial flexibility. A PrintTicket can be "attached" to an entire package and its settings will affect the whole package. PrintTickets can be further attached at lower levels in the structure (e.g., to individual pages or individual documents) and these PrintTickets will provide override settings to be used when printing the part to which they are attached.

A fixed payload is a payload whose root part is a FixedDocument part. There can be more than one fixed payload in a reach package.

A specific relationship type is defined to identify the root of a fixed payload within a reach package: the Reach Package Start Part. Consumers of reach packages (viewers or printers) use the Reach Package Start Part to find the fixed payload in the package.

The Reach Package Start Part must point to the <FixedDocumentSequence> or <FixedDocument> element that identifies the beginning of the fixed payload.

The payload includes the full closure of all of the parts required for valid processing of the FixedDocument. All content to be rendered must be contained in the reach package, including: the FixedDocument itself, all FixedPages referenced from within the FixedDocument, all image parts referenced by any of the FixedPages in the payload, all font parts referenced by any of the FixedPages in the payload, any PrintTickets attached to any part in the fixed payload, and any Annotations parts attached to the fixed payload.

The table below lists the valid part types that can be found in a reach package.

| Part | Description |
| --- | --- |
| FixedDocumentSequence | Specifies a sequence of FixedDocuments, adding a higher level of organization to the package. |
| FixedDocument | Each FixedDocument glues together a set of FixedPages in order. |
| FixedPage | Each FixedPage part represents the content of a page. |
| Font | Fonts MUST be embedded in a package to ensure reliable reproduction of the glyphs. |
| Image | Image parts MAY be included. |
| Thumbnail | A Thumbnail MAY be included to help end users identify package contents. |
| PrintTicket | PrintTickets MAY be included to provide settings to be used when printing the package. |
| Annotations | Annotations MAY be included. |

The markup in a FixedDocument part brings the pages of a document together to a common, easily-indexed root using the <FixedDocument> and <PageContent> elements.

Each FixedPage part represents a page's contents in a <FixedPage> element with <Path> and <Glyphs> elements (which are together the base for all marks rendered on a FixedPage), and the <Canvas> element to group them.

The FixedDocumentSequence part is used to bind a set of FixedDocuments into a single, larger document. For example, a printing client can use the FixedDocumentSequence part to roll-up multiple documents from various sources into a single package before sending the contents to the printer.

The document structure of the Metro fixed payload identifies FixedPages as part of a FixedDocument. Each <PageContent> element in the <FixedDocument> references by name (URI) a FixedPage part. Each FixedPage part contains FixedPage markup describing the rendering of a single page of content.

Images in JPEG, PNG, and TIFF formats can be used in reach packages. Images must use the required-resource relationship.

Thumbnail images may be attached using a relationship to the FixedDocument, FixedDocumentSequence, or FixedPage parts in the reach package. Only one thumbnail per part is allowed. For FixedDocuments and FixedDocumentSequences, a thumbnail image may be attached to assist someone using a consuming application in identifying the contents of the document. For example, a thumbnail may be a snapshot of the first page of the document, helping the user to choose the desired document from a list of document thumbnails.

For FixedPages, thumbnail images may be used that are snapshots of the contents of the FixedPage. These thumbnails can enable a user of a viewing application to choose the page to view.

Font parts are referenced using the FontUri attribute of the <Glyphs> element.

The purpose of the PrintTicket part is to provide user intent and device configuration information to printing consumers. PrintTicket parts can only be attached to FixedDocumentSequence, FixedDocument and FixedPage parts in the reach package Reach producers and consumers may include support for storing annotations of a Metro reach document alongside the reach payload itself. Annotations are considered to be Ignorable by default.

Consider now some principles of markup that are associated with reach packages.

The FixedDocument and FixedPage markup for the fixed payload in a Reach package is derived from the Longhorn XAML markup. That is, while the fixed payload markup stands alone as an independent XML markup format (as documented in the Metro Modular Content Format specification), it also loads exactly as is on Longhorn systems, and renders a WYSIWYG reproduction of the original multi-page document.

This fixed payload markup is a very minimal, parsimonious subset of Longhorn XAML markup rendering primitives. It represents visually anything that can be represented in Longhorn, with full fidelity. The fixed payload markup is a subset of Longhorn XAML elements and properties-plus additional conventions, canonical forms, or restrictions in usage compared to Longhorn XAML markup. Metro consumers sequentially process the fixed payload markup, layering each new element on top of previously rendered elements.

The minimal fixed payload markup set reduces the cost associated with implementation and testing of Reach package readers, such as printer RIPs or interactive viewer applications—as well as reducing the complexity and memory footprint of the associated parser. The parsimonious markup set also minimizes the opportunities for subsetting, errors, or inconsistencies among Reach package writers and readers, making the format and its ecosystem inherently more robust.

In addition to the minimal fixed payload markup, the Reach package will specify markup for additional semantic information to support viewers or presentations of Reach package documents with features such as hyperlinks, section/outline structure and navigation, text selection, and document accessibility.

A FixedPage part is expressed in an XML-based markup language, based on XML elements, XML attributes, and XML namespaces. Although FixedPage markup is expressed using XML elements and XML attributes, its specification is based upon a higher-level abstract model of "Contents" and "Properties". The FixedPage elements are all expressed as XML elements. Only a few FixedPage elements can hold "Contents", expressed as child XML elements. But a property-value may be expressed using an XML attribute or using a child XML element, depending on the property. FixedPage Markup also depends upon the concepts of resource dictionary and resources. The combination of a resource dictionary and multiple resources allow multiple markup elements to share common property-values.

The following discussion briefly describes some exemplary document markup elements that are utilized in the Reach paradigm.

The FixedDocumentSequence element specifies a sequence of FixedDocuments, adding a higher level of organization to the package. In this particular embodiment, only FixedDocument and FixedDocumentSequence children can be referenced from within a FixedDocumentSequence part. FixedDocuments are referenced using the <DocumentReference> element and a source attribute that specifies the URI of the FixedDocument part, an example of which is provided just below:

```
<FixedDocumentSequence xmlns="http://schemas.microsoft.com/metro/2005/02/rp">
    <DocumentReference Source="FixedDoc1"/>
    <DocumentReference Source="FixedDoc2"/>
</FixedDocumentSequence>
```

The DocumentReference element is used to specify FixedDocument parts within a FixedDocumentSequence.

The FixedDocument part of the fixed payload content is specified in markup with the <FixedDocument> element. The <FixedDocument> element logically binds an ordered sequence of pages together into a single multi-page document. The <PageContent> element is the only allowable child element of the <FixedDocument> element. The <PageContent> elements must be in sequential markup order matching the page order of the document.

Each <PageContent> element refers to the source of the content for a single page. To determine the number of pages in the document, count the number of <PageContent> children contained within the <FixedDocument>. The <PageContent> element has a single required attribute, Source, which refers to the FixedPage part for the contents of a page. <PageContent has only one allowable child element, <PageContent.LinkTargets>, and must contain only a single child. The <PageContent.LinkTargets> element specifies the URI target of a hyperlink.

Each FixedPage part represents a page's contents in a <FixedPage> element with <Path> and <Glyphs> elements, using the <Canvas> element to group them. The <Path> and <Glyphs> elements are together the base for all marks rendered on a FixedPage. The <FixedPage> element is used in the sample markup below.

```
//  /content/p1.xml
<FixedPage Height="1056" Width="816" xml:lang="en-US">
    <Glyphs
        OriginX = "96"
        OriginY = "96"
        UnicodeString = "This is Page 1!"
        FontUri = "../Fonts/Times.TTF"
        FontRenderingEmSize = "16"
    />
</FixedPage>
```

The <Canvas> element is used to group elements together. Typically, FixedPage elements are grouped together in a <Canvas> when they share a composed common attribute (i.e., Opacity, Clip, RenderTransform, or OpacityMask). By grouping these elements together on a Canvas, common attributes can often be applied to the canvas instead of to the individual elements.

The following markup example illustrates the use of <Canvas>.

```
<Canvas>
    <Path>
        <Path.Fill>
            <SolidColorBrush Color="#0000FF"/>
        </Path.Fill>
        <Path.Data>
            <PathGeometry>
```

```
            <PathFigure>
                <StartSegment Point="0,0"/>
                <PolylineSegment Points="100,0 100,100
0,100 0,0"/>
                <CloseSegment/>
            </PathFigure>
        </PathGeometry>
    </Path.Data>
    </Path>
</Canvas>
```

The FixedPage or Canvas elements are the elements on which other elements are rendered. The arrangement of content is controlled by properties specified for the FixedPage or Canvas, the properties specified for elements on the FixedPage or Canvas, and by compositional rules defined for the fixed payload namespace.

In fixed markup, all elements are positioned relative to the current origin (0,0) of the coordinate system. The current origin can be moved by applying the RenderTransform attribute to each element of to the FixedPage or Canvas that contains an element. The following example illustrates positioning of elements through RenderTransform.

```
<Canvas>
    <Canvas.Resources>
        <PathGeometry x:Key="StarFish">
            <StartSegment Point="50,0"/>
            <PolyLineSegment Points="55,45 100,25 55,50 80,100
50,55 20,100 45,50 0,25 45,45"/>
            </CloseSegment>
        </PathGeometry>
    </Canvas.Resources>
    <!-- Draw a green StarFish shifted by 100 to the right and 50 down
-->
    <Canvas>
        <Canvas.RenderTransform>
            <MatrixTransform Matrix="1,0,0,1,100,50"/>
        </Canvas.RenderTransform>
        <Path Data="{StaticResource StarFish}">
            <Path.Fill>
                <SolidColorBrush Color="#00FF00"/>
            </Path.Fill>
        </Path>
    </Canvas>
    <!-- Draw a red StarFish shifted by 200 to the right and 250 down
-->
    <Canvas>
        <Canvas.RenderTransform>
            <MatrixTransform Matrix="1,0,0,1,200,250"/>
        </Canvas.RenderTransform>
        <Path Data="{StaticResource StarFish}">
            <Path.Fill>
                <SolidColorBrush Color="#FF0000"/>
            </Path.Fill>
        </Path>
    </Canvas>
</Canvas>
```

The <Path> element has a region and a fill. A path is described by specifying the required Geometry.Data child element and the rendering attributes, such as Fill or Opacity.

The <Glyphs> element is used to represent a run of text, all from the same font. The <Glyphs> element provides information for accurate rendering, as well as supporting search and selection features in Reach viewers.

In this particular implementation example, a brush is used to paint the interior of geometric shapes defined by the <Path> element, and to fill the character outlines rendered with a <Glyphs> element. A brush is also used in defining the alpha-transparency mask in <Canvas.OpacityMask>, <Path.OpacityMask>, and <Glyphs.OpacityMask>. The FixedPage markup includes, in this particular example, the following brushes:

| Brush Name | Description |
| --- | --- |
| SolidColorBrush | Fills defined geometric regions with a solid color. |
| ImageBrush | Fills a region with an image. |
| VisualBrush | Fills a region with a vector drawing. |
| LinearGradientBrush | Fills a region with a linear gradient. |
| RadialGradientBrush | Fills a region with a radial gradient. |

Attributes vary across brushes, although all brushes have an Opacity attribute.

Brushes are expressed as children of the <Path.Fill>, <Glyph.Fill>, and <OpacityMask> elements. The use of a brush in markup is shown below:

```
        <Path>
            <Path.Fill>
                <SolidColorBrush Color="#00FFFF"/>
            </Path.Fill>
            ...
        </Path>
```

All Brushes that are defined relative to a coordinate system (ImageBrush, VisualBrush, LinearGradientBrush, RadialGradientBrush) may have a transform associated with them. The Transform property on a brush is concatenated with the current effective RenderTransform to yield an effective render transform local to the brush. The Viewport for the brush is then transformed using that local effective render transform.

For additional information on the reach document and general framework, the reader is referred to the Applications mentioned above.

Against this particular backdrop and in this context, we will now consider the method of FIG. 2. Recall that the FIG. 2 method can be broken up into two primary stages. A first stage that processes data that is to be, for example, printed on a printer and builds a display list that contains individual primitives. The second stage then sets about resolving primitive intersections, performs brush composition and decomposition.

In this particular example, the input data that is received is in the form of a tree of hierarchically arranged elements that describe a particular document and its attributes and properties. Accordingly, the first stage is referred to as "tree flattening" which processes the hierarchical tree to break down the elements of the tree into a display list. The second stage then processes the display list to resolve primitive intersection.

The description just below embellishes step 200 in FIG. 2 in accordance with one embodiment. That is, in the specific context described above in the section entitled "Implementation Example", the step of building a display list comprising individual primitive can be accomplished as follows.

Tree Flattening

First, the method walks the tree and calculates combined transformation, clip and opacity for each leaf node. This step is directed to ascertaining how the primitives are to be rendered. For example, during the rendering process, the description of primitives that appears in the markup may need to be transformed as by being converted from one coordinate system to another. In some embodiments, this is done by applying what is known as a transformation matrix. A clip describes a region to which a brush is to be applied. In the case of a path element, a clip describes the region to which the brush is to be applied by the path's geometry. In the case of a glyph element, a clip describes the region to which a brush can be applied to the outline of the glyph.

Next, if a sub-tree has opacity associated with it, the sub-tree is treated as a separate tree and has both tree flattening (as described here) and opacity flattening (as described below) applied to it. Applying both tree flattening and opacity flattening to the sub-tree has the effect of converting the sub-tree to a disjoint primitive list. After converting the sub-tree to the disjoint primitive list, opacity can now be pushed down to each individual primitive (because opacity was originally to be applied to the sub-tree) and the disjoint primitive list can be appended to the larger primitive list that is being built.

If a geometry primitive has both a brush and a stroke associated with it, then the primitive is divided into two primitives. A stroke is provided by a pen element which specifies a brush and parameters for filling the pixels of the stroke. Stroke dimensions and how the stroke is to be drawn are defined by various properties that are associated with the pen element, e.g. various dash parameters, end line and start line parameters, thickness parameters and the like. One of the two primitives into which the geometry primitive is divided is filled with the brush; and the other of the primitives is filled or stroked with the pen. Further, if the pen has opacity associated with it, the filling primitive is clipped with the complement of the outline of the stroking. Each primitive is then added to the upper layer display list.

If a visual brush is being used, it may be more cost effective to unfold its usage to the primitives it contains. For example, if a visual brush contains one star shape, and it is only applied in a 2-by-2 tile, then it can be unfolded into four star shapes with the right size and location.

When a primitive is added to a display list, its bounding box can be calculated. The bounding box can be used to determine if a primitive is completely out of the canvas area, or completely outside of the clipping area. In both cases, such primitive can be discarded. The bounding box is also used to rule out whether two primitives overlap with each other in opacity flattening stage. Certain brushes may have attributes relative to its bounding box. For example, a linear gradient brush with a StartPoint being (0, 0) in relative mapping mode will start its gradient from the top left corner of the shape it is applied to. At this stage, all brushes are converted to absolute brushes using its bounding box.

The discussion below under the section entitled "Opacity Flattening" describes the second stage, which processes the display list to resolve primitive intersection.

Opacity Flattening

Once the display list is built, opacity flattening is applied to the display list. Specifically, in the process about to be described, the display list is walked from beginning to end to determine how to print the primitives on a page. The display list of primitives can contain such things as circles, rectangles, images, text and the like. Each primitive can have its own associated transformation, opacity or opacity mask as developed in the tree flattening stage. In addition, since the primitives can overlap and affect how the ultimately printed page looks, primitive intersections are attempted to be resolved. Hence, this is where brush composition and brush algebra enters the scene, as will become apparent below.

Specifically, during the processing, the display list is walked and, for those primitives that overlap, brush composition is attempted for those regions of overlap. If a brush list is generated because of the complexities of the brushes, then brush decomposition is performed in an attempt to decompose the brushes into a series of simple brushes. The decomposition process repeats until there are only simple brushes left. If the resultant brushes still have opacity associated with them, then they can be blended with a solid background color, e.g. white assuming that printing takes place on a white background.

When there is no way to decompose a brush list, the subject area is rasterized into a bitmap using all of the brushes involved. The primitive is then converted to an image primitive that the printer understands and is printed.

Figure 4:
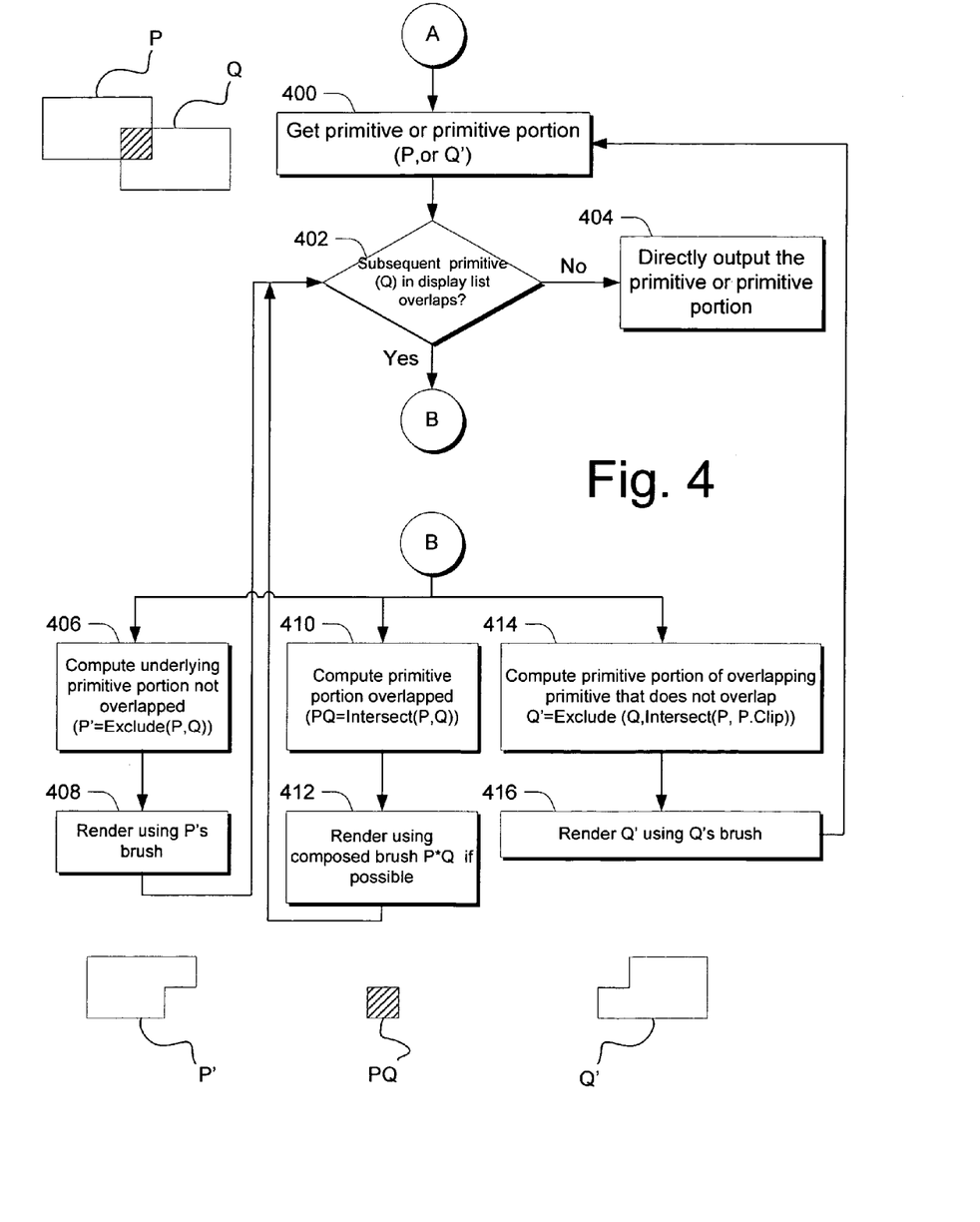
FIG. 4 is a flow diagram that describes steps in a method in accordance with one embodiment.

Consider now the flow diagram of FIG. 4 which illustrates an opacity flattening method in accordance with one embodiment. The method can be implemented in connection with any suitable hardware, software, firmware or combination thereof.

The method starts at "A" where the display list that was built above is walked from beginning to end. In the discussion of this method, an example of two overlapping primitives P and Q is shown. Specifically, in the illustration just to the left of step 400, primitive P underlies primitive Q. The area or region of overlap is shown by the cross-hatched area. For ease of explanation, we will assume only these two primitives. It should be apparent, to the skilled artisan, that this method recurses through all of the primitives in the display list.

Step 400 gets the first primitive in the display list. In our example, this is primitive P. In the recursive processing that takes place, however, this step can get and process primitive portions, as will become apparent below.

Step 402 ascertains whether a subsequent primitive in the display list overlaps with the current primitive—in this case P. If there is no overlap, then step 404 directly outputs the primitive, thus sending it to next stage of conversion. If, on the other hand, step 402 ascertains that there is an overlapping primitive, the method branches to "B".

Here, a number of recursive steps can take place to identify specific overlapping regions so that brush composition can be attempted. First, step 406 computes an underlying primitive portion that is not overlapped with another primitive portion. In our specific example, the underlying primitive portion is computed as follows:

$$P'=\text{Exclude } (P,Q).$$

To assist the reader, primitive portion P' is shown below step 406. Step 408 then renders this primitive portion using the brush associated with the underlying primitive—in this case, P's brush. The method then returns to step 402 to attempt to find other additional primitives in the display list that might overlap with this primitive portion, and process those primitives as described above and below.

In addition to computing P', and after execution of the branch 406–408 with regard to primitive portion P' through the entire display list, step 410 computes a primitive portion that is overlapped. In our specific example, the primitive portion that is overlapped is computed as follows:

$$PQ=\text{Intersect}(P,Q).$$

To assist the reader, primitive portion PQ is shown below step 410. Step 412 then renders this primitive portion using a composed brush P*Q, if it is possible to compose the brushes. If it is not possible to compose the brushes, then the brushes are added to a brush list for subsequent brush decomposition, as described above. The method then returns to step 402 to attempt to find other addition primitives in the display list that might overlap with this primitive portion, and process those primitives as described above and below.

In addition to computing P' and PQ, and after execution of the branch 410–412 with regard to primitive portion PQ through the entire display list, step 414 computes a primitive portion of the overlapping primitive that does not overlap with the underlying primitive. In our specific example, the primitive portion of the overlapping primitive is computer as follows:

$$Q'=\text{Exclude }(Q,\text{Intersect}(P, P.\text{Clip})).$$

To assist the reader, primitive portion Q' is shown below step 414. Step 416 then renders the primitive portion using the brush associated with the overlying primitive—in this case, the brush associated with Q. The method then returns to step 400 and, using primitive portion Q' as the primitive of interest, looks for subsequent new primitives in the display list that overlaps with the primitive portion. If step 402 finds no such primitive, then step 404 directly outputs the primitive portion. On the other hand, if step 402 finds an overlapping primitive, the method repeats steps 406–416 until all of the primitives and primitive portions in the display list have been processed.

In addition, during the above-described processing, when a particular geometry with stroke touches another primitive, the geometry is converted to fill the outline with the stroke's brush. Further, when a GlyphRun touches other primitives, it is converted to fill its outline with the GlyphRun's foreground brush. Such conversion is only performed when needed, because their original form is more compact.

Exemplary System

Figure 5:
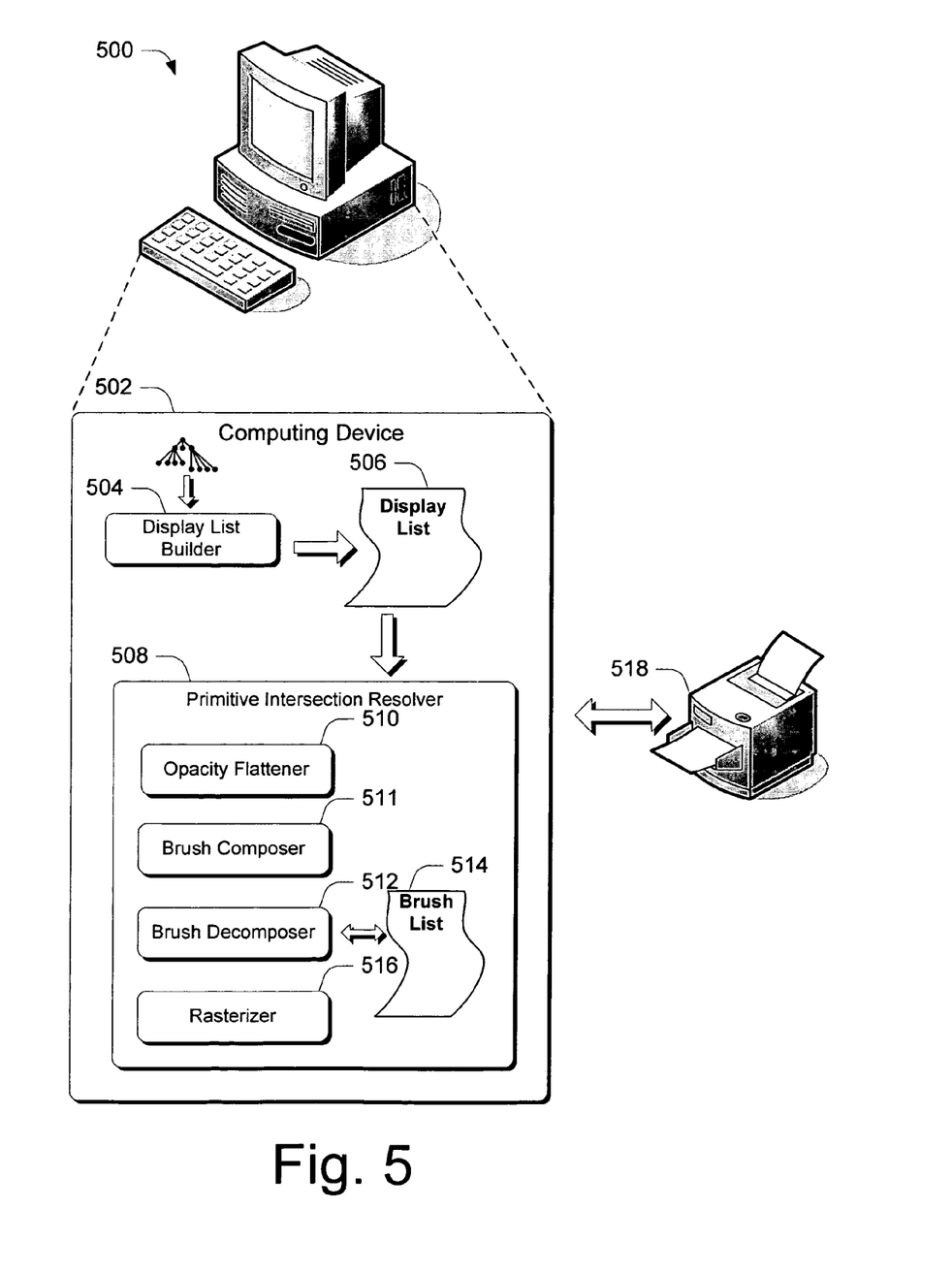
FIG. 5 illustrates an exemplary system in accordance with one embodiment.

FIG. 5 shows an exemplary system in which the inventive principles described above can be employed, generally at 500. In this example, system 500 includes a computing device 502 that is configured to implement the techniques describe above. Specifically, device 502 is configured to process graphics primitives that include opacity attributes such that the primitives can be employed in the context of a system or device that does not necessarily support opacity. Devices that do not necessarily support opacity can include display devices (such as the illustrated monitor), and various printers, such as printer 518.

In the illustrated and described embodiment, computing device 502 includes a display list builder 504 that processes data that includes graphics primitives that are to be rendered, into a display list 506. Such data can assume any suitable format. One example of such a format is described above in the context of a hierarchical tree that describes a document and its attributes and properties using a hierarchical tree structure. Processing of the data can take place in any suitable way to build the display list 506, examples of which are given above.

In addition, computing device 502 includes a primitive intersection resolver 508. Characteristics of the primitive intersection resolver, in accordance with one embodiment, include an ability to process the display list to resolve primitive intersections and, in accordance with the resolved primitive intersections, remove opacity attributes which may not necessarily be supported by a device on which the primitives are intended to be rendered.

In one embodiment, this functionality is provided in the form of an opacity flattener 510, brush composer 511, brush decomposer 512, brush list 514 and rasterizer 516. In operation, the opacity flattener processes the display list, as described above, to recursively identify primitives and primitive intersections, and then processes them, in concert with the brush composer 511, to render the primitives and primitive portions. In an event two or more brushes cannot be composed into one simple brush, as described above, a brush list is maintained for subsequently attempting to decompose the brushes. If the brushes can be decomposed, then rendering of the affected primitives takes place. If not, then rasterizer 516 is utilized to rasterized the affected region using all of the brushes involved.

The processing that is performed using the opacity flattener 510, brush composer 511, brush decomposer 512 and rasterizer 516 creates graphical elements that have deterministic colors that are independent from any previously included graphical element or primitive. These graphical elements can then be translated into an appropriate form, such as into PDL commands using a printer driver, for output to printer 518 or any other suitable device.

Figure 6:
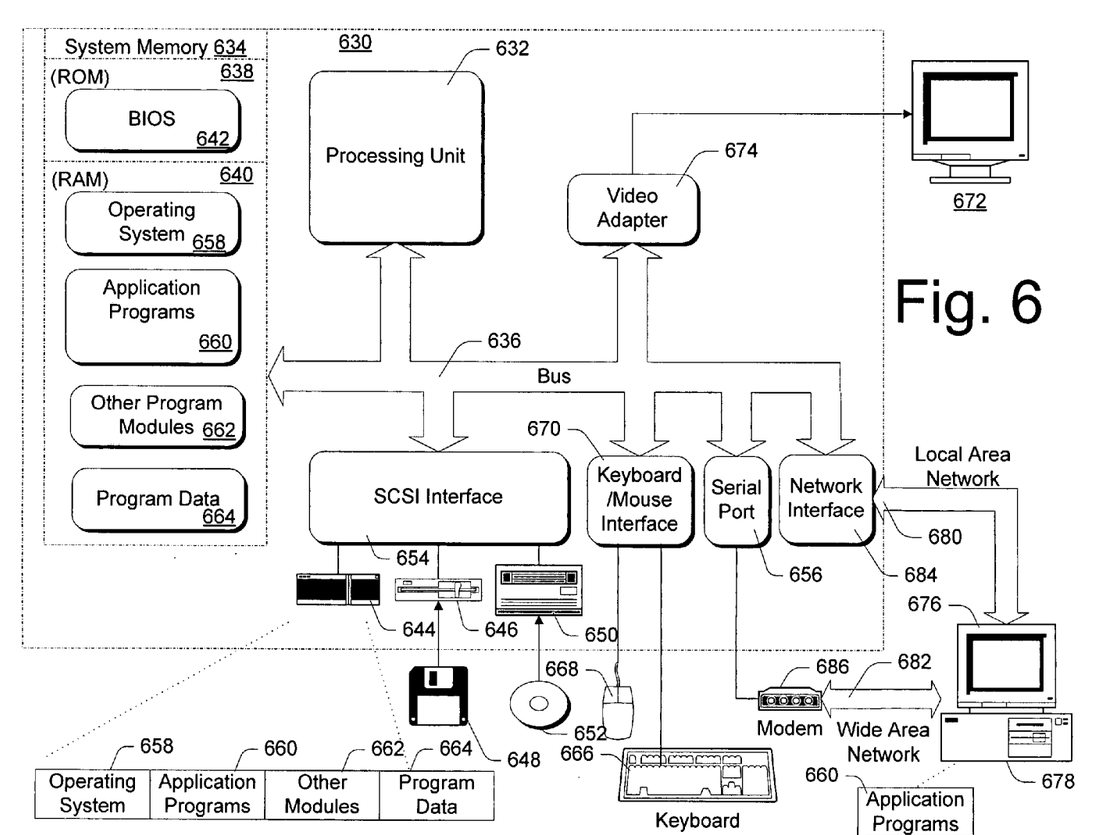
FIG. 6 illustrates an exemplary computing device in accordance with one embodiment.

FIG. 6 shows an exemplary computer system having components that can be used to implement one or more of the embodiments described above.

Computer system 630 includes one or more processors or processing units 632, a system memory 634, and a bus 636 that couples various system components including the system memory 634 to processors 632. The bus 636 represents one or more of any of several types of bus structures, including a memory bus or memory controller, a peripheral bus, an accelerated graphics port, and a processor or local bus using any of a variety of bus architectures. The system memory 634 includes read only memory (ROM) 638 and random access memory (RAM) 640. A basic input/output system (BIOS) 642, containing the basic routines that help to transfer information between elements within computer 630, such as during start-up, is stored in ROM 638.

Computer 630 further includes a hard disk drive 644 for reading from and writing to a hard disk (not shown), a magnetic disk drive 646 for reading from and writing to a removable magnetic disk 648, and an optical disk drive 650 for reading from or writing to a removable optical disk 652 such as a CD ROM or other optical media. The hard disk drive 644, magnetic disk drive 646, and optical disk drive 650 are connected to the bus 636 by an SCSI interface 654 or some other appropriate interface. The drives and their associated computer-readable media provide nonvolatile storage of computer-readable instructions, data structures, program modules and other data for computer 630. Although the exemplary environment described herein employs a hard disk, a removable magnetic disk 648 and a removable optical disk 652, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 644, magnetic disk 648, optical disk 652, ROM 638, or RAM 640, including an operating system 658, one or more application programs 660, other program modules 662, and program data 664. In addition, these program modules can implement the functionality described above.

A user may enter commands and information into computer 630 through input devices such as a keyboard 666 and a pointing device 668. Other input devices (not shown) may include a microphone, joystick, game pad, satellite dish, scanner, or the like. These and other input devices are connected to the processing unit 632 through an interface 670 that is coupled to the bus 636. A monitor 672 or other type of display device is also connected to the bus 636 via an interface, such as a video adapter 674. In addition to the monitor, personal computers typically include other peripheral output devices (not shown) such as speakers and printers.

Computer 630 commonly operates in a networked environment using logical connections to one or more remote computers, such as a remote computer 676. The remote computer 676 may be another personal computer, a server, a router, a network PC, a peer device or other common network node, and typically includes many or all of the elements described above relative to computer 630, although only a memory storage device 678 has been illustrated in FIG. 6. The logical connections depicted in FIG. 6 include a local area network (LAN) 680 and a wide area network (WAN) 682. Such networking environments are commonplace in offices, enterprise-wide computer networks, intranets, and the Internet.

When used in a LAN networking environment, computer 630 is connected to the local network 680 through a network interface or adapter 684. When used in a WAN networking environment, computer 630 typically includes a modem 686 or other means for establishing communications over the wide area network 682, such as the Internet. The modem 686, which may be internal or external, is connected to the bus 636 via a serial port interface 656. In a networked environment, program modules depicted relative to the personal computer 630, or portions thereof, may be stored in the remote memory storage device. It will be appreciated that the network connections shown are exemplary and other means of establishing a communications link between the computers may be used.

Generally, the data processors of computer 630 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The embodiments described herein includes these and other various types of computer-readable storage media when such media contain instructions or programs for implementing the steps described above in conjunction with a microprocessor or other data processor. Various embodiments also include the computer itself when programmed according to the methods and techniques described above.

For purposes of illustration, programs and other executable program components such as the operating system are illustrated herein as discrete blocks, although it is recognized that such programs and components reside at various times in different storage components of the computer, and are executed by the data processor(s) of the computer.

Conclusion

In the embodiments described above, opacity issues are addressed by focusing on the composition of objects having opacity effects in terms of the brushes that are used to render the objects. By focusing on the brushes that are used in the rendering process, instead of the individual objects and their particular colors, processing economies and efficiencies can be experienced. Specifically, in some instances, because of the particular way that overlapping objects interact, focusing on the brushes that are used with the individual objects and creatively attempting to combine or compose the brushes for operating on the areas of overlap, some processing steps that might otherwise have been required at the object/color level can be eliminated, thus providing a streamlined and efficient process.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method comprising:
   identifying primitives that overlap;
   identifying overlapping portions of the primitives;
   attempting to compose a new brush from at least one brush associated with a first of the primitives and at least one brush associated with a second of the primitives; and
   if said new brush is composed, using the new brush to render a corresponding portion of overlap.

2. The method of claim 1, wherein the act of attempting comprises, in an event a new brush cannot be composed:
   placing said at least one brush associated with the first primitive and said at least one brush associated with the second primitive in a brush list; and
   attempting to simplify the brush list when new brushes are added, estimate a cost associated with decomposition, discard unimportant brushes, and decompose brushes placed in the brush list.

3. The method of claim 2 further comprising, in an event a brush cannot be decomposed, rasterizing an associated portion.

4. The method of claim 1, wherein the act of attempting comprises attempting to algebraically combine said at least one brush associated with the first primitive and said at least one brush associated with the second primitive.

5. The method of claim 1, wherein brushes that are attempted to be composed to form a new brush comprise brushes selected from a group of brushes comprising: a solid color brush, an image brush, a visual brush, a linear gradient brush, or a radial gradient brush.

6. The method of claim 1, wherein brushes that are attempted to be composed to form a new brush comprise brushes selected from a group of brushes comprising: a solid color brush, an image brush, a visual brush, a linear gradient brush, a radial gradient brush, or a brush used as an opacity mask.

7. The method of claim 1 further comprising, prior to said acts of identifying, building a display list comprising the individual primitives.

8. The method of claim 7 further comprising prior to building the display list, receiving input data that is to be processed to build the display list, the input data being in the form of a hierarchically structured tree.

9. The method of claim 1 further comprising identifying non-overlapping portions of the primitives and rendering those non-overlapping portions using, respectively, a brush associated with the corresponding primitive of which the portion is a part.

10. The method of claim 9 further comprising attempting to identify other primitives that may overlap with said non-overlapping portions and, if found, attempting to compose a new brush from the brush associated with the non-overlapping portion and a primitive that is identified to overlap with the non-overlapping portion.

* * * * *